UNITED STATES PATENT OFFICE.

ALBRECHT SCHMIDT, OF HÖCHST-ON-THE-MAIN, GERMANY, ASSIGNOR TO THE FARBWERKE, VORMALS MEISTER, LUCIUS & BRÜNING, OF SAME PLACE.

RHODOLALKYLETHERESTER.

SPECIFICATION forming part of Letters Patent No. 656,426, dated August 21, 1900.

Application filed December 6, 1899. Serial No. 739,370. (Specimens.)

*To all whom it may concern:*

Be it known that I, ALBRECHT SCHMIDT, Ph. D., a citizen of the Empire of Germany, residing at Höchst-on-the-Main, Germany, have invented certain new and useful Improvements in the Process for Manufacturing Dyestuffs Fast to Soap from the Rhodol Series, of which the following is a specification.

The rhodols of the type

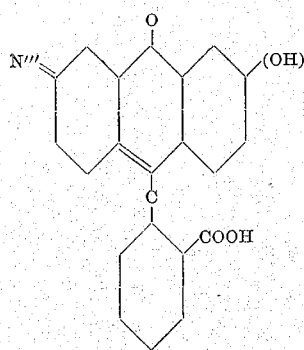

are inapplicable as dyestuffs on account of their not being fast to soap; also, the rhodol-carboxylicesters obtained by esterification at the carboxylic group and described in the German Patent No. 96,108 and German application No. B. 20,717 are exceedingly fugitive to soap. I have found that this lack of fastness has solely to be traced back to the free hydroxyl group and that the dyestuffs obtained on substituting the hydroxyl hydrogen by an alkyl group, (methyl, ethyl, benzyl, &c.,) of the type

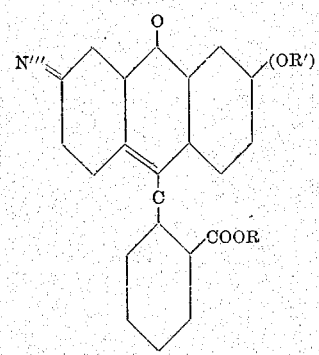

in contrast to the dyestuffs of the type

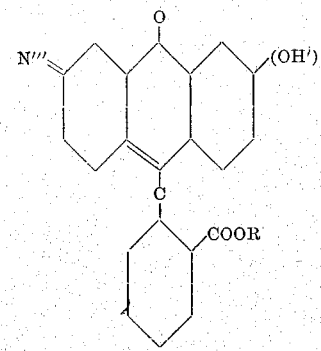

yield shades exceedingly fast to soap on calico mordanted with tannin. Substances of this kind have hitherto not been known. They are obtained by alkaline or neutral alkylation of the rhodols or rhodol-carboxylicesters. They may also of course be obtained by esterification of the hitherto-unknown rhodol-hydroxyl-ethers:

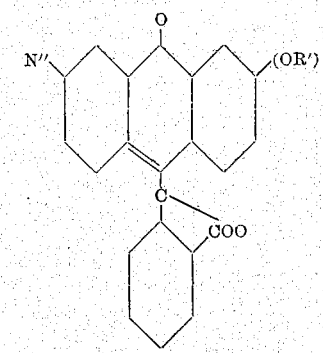

which latter are formed as intermediate products on the alkyline alkylation of rhodols or as products of separation on hydrolysis of the rhodol hydroxylether - carboxylicesters with alkali forming the subject of this application. These new rhodo dyestuffs distinguish themselves from the carboxylic esters of the application No. B. 20,717 not only by their shades fast to soap, but also by their not being precipitated by sodium carbonate and by their producing on hydrolysis with alkaline hydrates not rhodol soluble in alkali, as is the case with the rhodolcarboxylicesters; but alkylated rhodols alkylated at the hydroxyl group, which are soluble in acids, but not in alkalies, and which in their behavior are quite similar to rhodamines, as alkylating agents may serve those usually employed for the manufacture of phenolethers—such, for instance, as ethylbromid, benzylchlorid, dialkylsulfate, (dimethylsulfate.) According as one starts from rhodols or from the rhodolcarboxylicesters or even from rhodolhydroxylicethers rhodoletheresters may be produced in this way with similar or different alkyl groups.

I. *Resorcinol - diethyl - rhodol - methylether-methylester:*

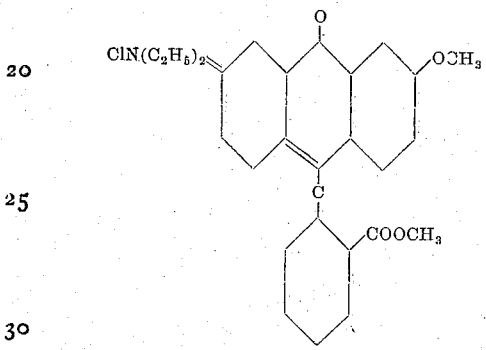

(a) *From diethyl-rhodol.*—A thorough mixture of one hundred and twenty parts, by weight, of the hydrochloride of diethyl-rhodol and one hundred and twenty parts of soda-ash are treated with one hundred and ninety parts of dimethylsulfate. While stirring, the mass becomes heated by itself to about 85° centigrade, viscous and finally solid. It is then allowed to stand for some time at ordinary temperature and is again heated for another one-half hour to 90° centigrade. The pulverized mass is stirred with hydrochloric acid diluted with water till it is completely dissolved and then salted out, whereupon the dyestuff is precipitated as a semiliquid red-yellow oil, gradually solidifying to crystalline crusts. The dyestuff is readily soluble in water and also in a not too concentrated solution of common salt. It is not precipitated by a solution of sodium carbonate. When boiled with sodium carboate or when treating the solution with soda-lye, hydrolysis takes place, whereupon the diethyl - rhodolhydroxyl - methylether separates as a colorless loose powder. The diethyl - rhodol - methylether - methylester dyes calico treated with tannin in ardent yellow-red shades fast to soap.

(b) *From diethyl-rhodolcarboxylicester.*— A thorough mixture of forty-one parts, by weight, of diethyl-rhodolcarboxylicester (according to No. B. 20,717) and twenty parts, by weight, of soda-ash are treated with thirty parts, by weight, of dimethylsulfate and further operated with exactly as in example I (a). The dyestuff thus obtained is identical with that described in example I (a).

(c) *From diethyl-rhodol-hydroxyl-methylether.*—Thirty-eight parts, by weight, of diethyl-rhodol-hydroxyl-methylether are heated for some time to 80 to 90° centigrade, preferably with some soda-ash, and twenty-five parts, by weight, of dimethylsulfate. The mass is further worked as described in example I (a). The dyestuff thus obtained is also identical with that described in example I (a). Instead of treating diethyl-rhodol-hydroxyl-methylether with dimethylsulfate it may also be esterified with methyl-alcohol and a mineral acid.

II. *Resorcinol-diethyl-rhodol-methylether-ethylester.*

(a) *From diethyl-rhodol-ethylester.*—Forty-three parts, by weight, of the hydrochloride of ethylester (according to No. B. 20,717) are thoroughly mixed with twenty parts, by weight, of soda-ash and brought into reaction with thirty parts, by weight, of dimethylsulfate, as described in example I (b). The methylether-methylester thus obtained exhibits no other characteristic properties than the methylether-methylester described in example I. The shades obtained with both dyestuffs are not to be distinguished.

(b) *From diethyl-rhodol-hydroxyl-methylether.*—If in example I (c) diethylsulfate or bromethyl be substituted for dimethylsulfate, then is obtained in the same manner the previously-described methylether-methylester.

III. *Resorcinol-dimethyl-rhodol-methylether-methylester.*

The procedure is the same as described in example I (a), (b), and (c). No characteristic distinction from the corresponding diethyl compounds is to be mentioned. The methyl compound, however, dyes somewhat more ardently. Its hydrochlorate is yet more readily soluble than that of the diethyl compound.

IV. *Resorcinol-diethyl-rhodol-benzylether-methylester.*

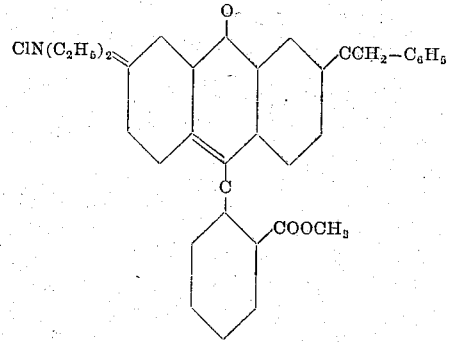

Eighty-four parts, by weight, of the hydrochloride of diethyl-rhodol are dissolved in two hundred parts, by weight, of water and seventy parts, by weight, of soda-lye of 40° Baumé, specific gravity, and this solution, while adding fifty parts, by weight, of benzylchlorid, is boiled for several hours in a vessel provided with an inverted condenser, when the diethyl-rhodol-benzylether, insoluble in alkali,

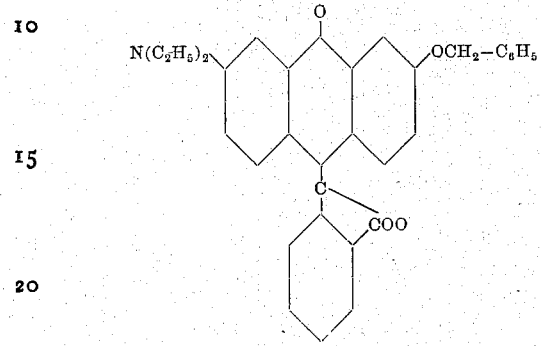

separates. When dried and pulverized, it is mixed with dimethylsulfate (one part) and heated, preferably with soda-ash, (one-half part,) for about one and one-half hours from 80° to 90° centigrade. The pulverized mass is stirred with hydrochloric acid, and water is added till it dissolves. The solution is then filtered and salted out. The hydrochlorate gradually solidifies to a brittle mass. It is readily soluble in water. A solution of sodium carbonate does not precipitate it. Soda-lye produces hydrolysis, whereupon the diethyl-rhodol-benzylether separates as a resinous body. The vivid yellow-red shades produced on calico treated with tannin are hardly to be distinguished from those of the corresponding methylether-methylester.

V. *Resorcinol-mono-ethyl-rhodol-methylether-methylester.*

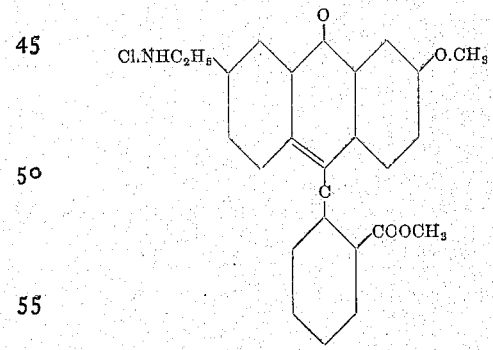

The manufacture from mono-ethyl-rhodol is here quite analogous to that from diethyl-rhodol, example I (*a*) and (*c*). The hydrochlorate, readily soluble in water, dyes yellower than the corresponding ethyl compound. The solutions in contrast to the latter are of a strong yellow fluorescence.

VI. (*Hydrochinon*)-*diethyl-rhodol-methyl-ether-methylester.*

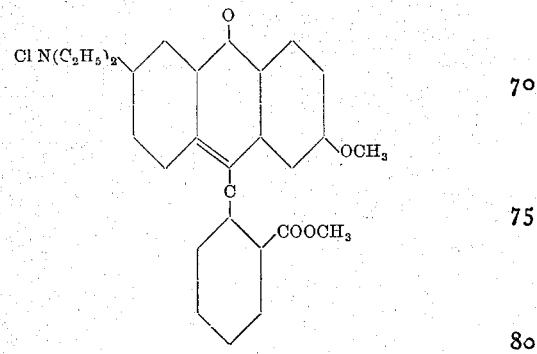

If in the aforesaid examples resorcinol-diethyl-rhodols be substituted for hydrochinon-diethyl-rhodol, (from diethyl-m-amidoöxy-benzylbenzoic acid and hydrochinon,) then the corresponding hydrochinon-rhodol-methylether-methylester is obtained in exactly the same manner and of analogous properties, yet with this difference that the shades obtained therewith on calico treated with tannin are not yellow-red, but blue-red. These shades are also fast to soap.

VII. (*Dioxynaphthalene*)-*diethyl-rhodol-methylether-methylester.*

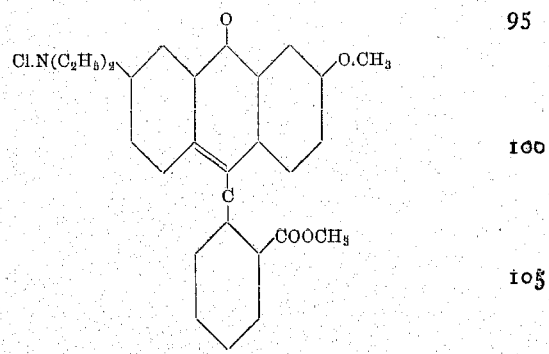

The diethyl-rhodol obtained from 2.7 dioxynaphthalene and diethyl-m-amidoöxy-benzoylbenzoic acid having the probable constitution

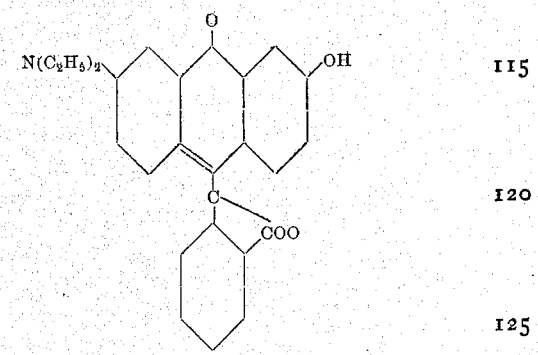

yields when treated according to example I (*a*) and (*c*) a methylether-methylester quite analogous to the previous ones, and which is strictly distinguished from the carboxylic-methylester obtained from this rhodol by means of esterification with methyl alcohol and an acid. The solutions of the carboxylic-methylester are precipitated by sodium carbonate, but the former not. The bluish-red tints obtained on calico treated with tannin of the shade 6G are fast to soap in the first case and not in the latter.

Having now described my invention, what I claim is—

As new products, the rhodolalkyletheresters, being greenish yellow-red powders, soluble in water and alcohol and undergoing hydrolysis and separation of the rhodolether when boiled with soda-lye, substantially as set forth.

In testimony that I claim the foregoing as my invention I have signed my name in presence of two subscribing witnesses.

ALBRECHT SCHMIDT.

Witnesses:
HEINRICH HAHN,
ALFRED BRISBOIS.